United States Patent
Kiehler et al.

(10) Patent No.: US 7,527,334 B2
(45) Date of Patent: May 5, 2009

(54) AUTOMOTIVE SEAT RECLINING SYSTEM

(75) Inventors: Christopher James Kiehler, South Lyon, MI (US); Min Weng, Novi, MI (US); Karl Otto Sonnenberg, Ferndale, MI (US); Thomas H. Overbeck, Dearborn, MI (US); Paul Gerard Ferraiuolo, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/764,356

(22) Filed: Jun. 18, 2007

(65) Prior Publication Data

US 2008/0309138 A1     Dec. 18, 2008

(51) Int. Cl.
*B60N 2/42* (2006.01)
*B60N 2/427* (2006.01)
*B60N 2/22* (2006.01)
*B60R 21/00* (2006.01)

(52) U.S. Cl. .............................. 297/216.13; 297/216.1; 297/216.14; 297/216.15; 297/362.12

(58) Field of Classification Search ............. 297/216.1, 297/216.13, 216.14, 216.15, 362.12
See application file for complete search history.

(56) References Cited

U.S. PATENT DOCUMENTS

| | | | |
|---|---|---|---|
| 3,697,128 A | | 10/1972 | Strien et al. |
| 4,688,662 A | * | 8/1987 | Correll ................ 297/216.1 X |
| 5,645,316 A | * | 7/1997 | Aufrere et al. ......... 297/216.13 |
| 5,839,782 A | * | 11/1998 | Kashiwamura et al. .. 297/216.1 X |
| 6,039,399 A | * | 3/2000 | Whalen et al. ........ 297/216.1 X |
| 6,048,034 A | * | 4/2000 | Aumont et al. ....... 297/216.1 X |
| 6,352,312 B1 | * | 3/2002 | Rees ................... 297/216.1 X |
| 6,371,561 B1 | | 4/2002 | Iwamoto et al. |
| 6,520,582 B2 | | 2/2003 | Glance |
| 6,719,368 B1 | | 4/2004 | Neale |
| 6,773,075 B2 | * | 8/2004 | Rouhana et al. ..... 297/216.13 X |
| 6,779,841 B2 | * | 8/2004 | Eckendorff ............ 297/216.13 |
| 6,921,132 B2 | * | 7/2005 | Fujita et al. ........... 297/216.13 |
| 6,926,358 B2 | * | 8/2005 | Fujita et al. ........... 297/216.14 |
| 6,938,953 B2 | | 9/2005 | Haland et al. |
| 7,077,472 B2 | * | 7/2006 | Steffens, Jr. ........... 297/216.13 |
| 7,104,601 B2 | * | 9/2006 | Masuda et al. ........... 297/216.1 |
| 7,156,457 B2 | * | 1/2007 | Fujita et al. .............. 297/216.1 |
| 7,201,447 B2 | * | 4/2007 | Yamada .............. 297/216.13 X |
| 7,281,766 B2 | * | 10/2007 | Fujita et al. ......... 297/362.12 X |
| 7,303,229 B2 | * | 12/2007 | Fujita et al. ........... 297/216.14 |
| 7,416,256 B2 | * | 8/2008 | Fujita et al. ............ 297/216.1 X |
| 2003/0102701 A1 | * | 6/2003 | Pedronno et al. ......... 297/216.1 |
| 2004/0178667 A1 | * | 9/2004 | Fujita et al. .............. 297/216.1 |
| 2004/0232743 A1 | * | 11/2004 | Fujita et al. .............. 297/216.1 |
| 2005/0231011 A1 | * | 10/2005 | Fujita et al. ............ 297/216.14 |
| 2005/0242634 A1 | | 11/2005 | Serber |
| 2006/0138817 A1 | * | 6/2006 | Gorman et al. ........ 297/216.15 |
| 2007/0205643 A1 | * | 9/2007 | Fujita et al. ......... 297/216.13 X |

* cited by examiner

*Primary Examiner*—Rodney B White
(74) *Attorney, Agent, or Firm*—Gregory Brown; Brooks Kushman P.C.

(57) ABSTRACT

A cross member assembly for adjusting a reclinable vehicle seat includes a joint. The joint permits the cross member assembly to deflect during a vehicle impact if the reclinable vehicle seat is occupied.

14 Claims, 5 Drawing Sheets

AUTOMOTIVE SEAT RECLINING SYSTEM

BACKGROUND

1. Field of the Invention

The invention relates to automotive seat reclining systems.

2. Discussion

A reclining mechanism for a reclinable vehicle seat may include a one-piece shaft to transmit torque generated by a motor on one side of the seat back to a gear on the other side of the seat back. This torque turns the gear which, in turn, causes the seat back to rotate.

The dynamics associated with a rear impact event may cause an occupant of a vehicle seat to load the seat back. The degree to which the seat back is loaded by the occupant may affect how quickly a head of the occupant contacts a head restraint of the vehicle seat.

SUMMARY

Embodiments of the invention may take the form of a reclining seat for a vehicle. The reclining seat includes a bottom frame and a back frame movable relative to the bottom frame. The reclining seat also includes an adjuster system for moving the back frame relative to the bottom frame. The adjuster system includes a cross talk assembly having first and second members. The first and second members are configured to slip relative to each other during vehicle impact if the seat is occupied.

Embodiments of the invention may take the form of an automotive vehicle including a reclinable seat. The reclinable seat includes a rotatable back, a bottom, and a reclining system for rotating the back relative to the bottom. The reclining system includes a torque transmitting assembly for transmitting torque to rotate the back relative to the bottom. The torque transmitting assembly includes first and second limbs. The first and second limbs are configured to move relative to each other during vehicle impact, if the seat is occupied, to permit occupant intrusion into the seat.

DETAILED DESCRIPTION

Current one-piece recliner rod assemblies may limit occupant intrusion into the seat during vehicle impact. Some embodiments of the invention provide recliner joints that permit increased occupant intrusion into the seat during vehicle impact. Such occupant intrusion may permit the head of an occupant to more quickly contact the head restraint and reduce occupant acceleration.

Figure 1:
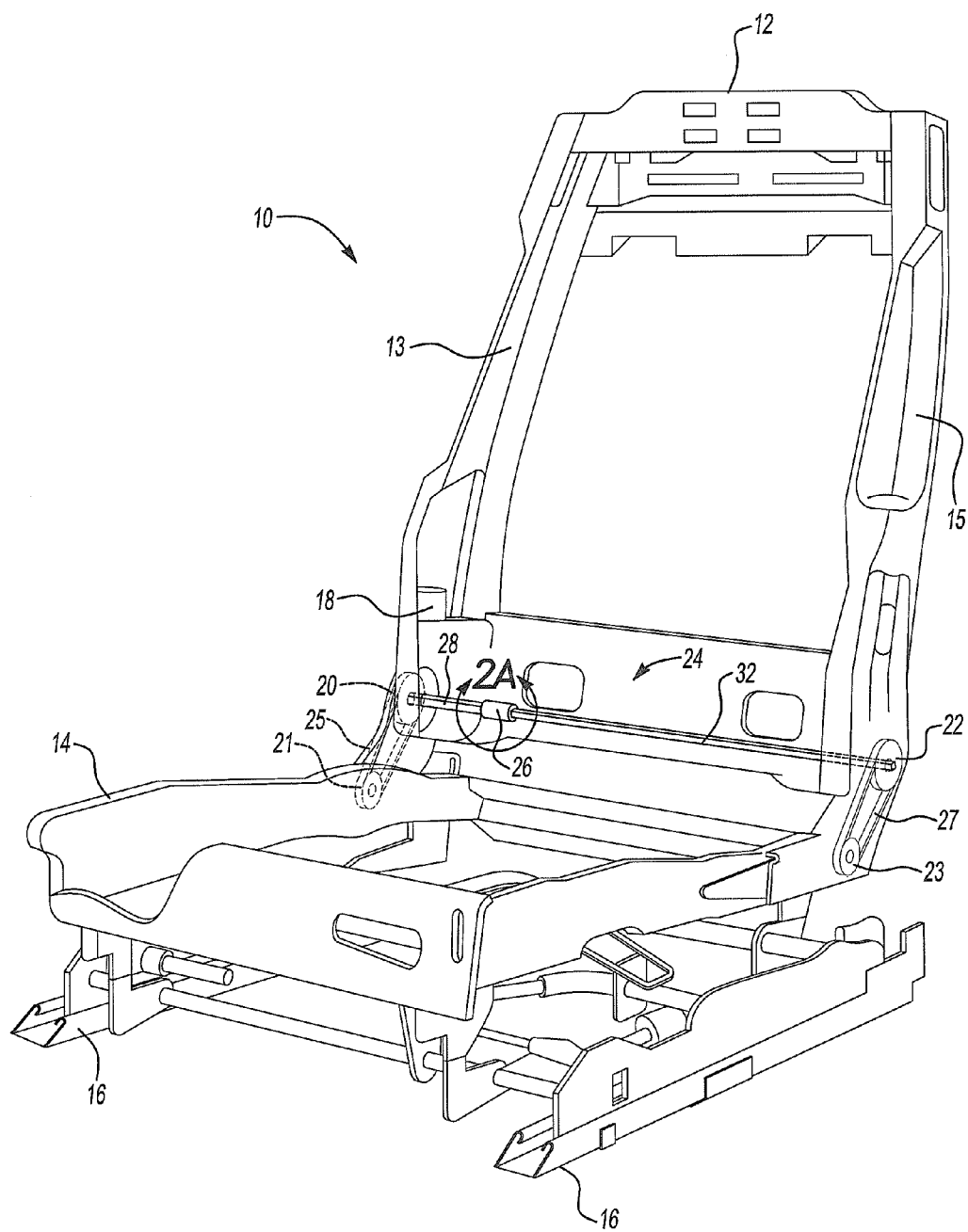
FIG. 1 is a perspective view of a support structure for a reclining vehicle seat.

FIG. 1 is a perspective view of reclining seat 10 (shown without cushions). Seat back 12, including sides 13, 15, provide support for a back of an occupant (not shown). Seat bottom 14 provides support for a bottom an occupant. Seat bottom 14 is attachable, e.g., bolted, to a vehicle (not shown) via mounting tracks/feet 16.

Seat back 12 may be rotated, in typical fashion, relative to seat bottom 14 via motor 18, gears 20, 22, and cross member assembly 24. Motor 18 mechanically communicates with gears 20, 22. Torque is provided to gears 20, 22 via cross member assembly 24. This torque turns gears 20, 22 thereby rotating seat back 12 relative to seat bottom 14 via, for example, fixed gears 21, 23 and flexible linkages 25, 27. Other mechanisms may also be used to rotate seat back 12 relative to seat bottom 14, e.g., gears, brackets, single-sided recliner assemblies, dual-sided recliner assemblies, etc. In alternative embodiments, seat back 12 may be manually rotated relative to seat bottom 14.

Figure 2A:
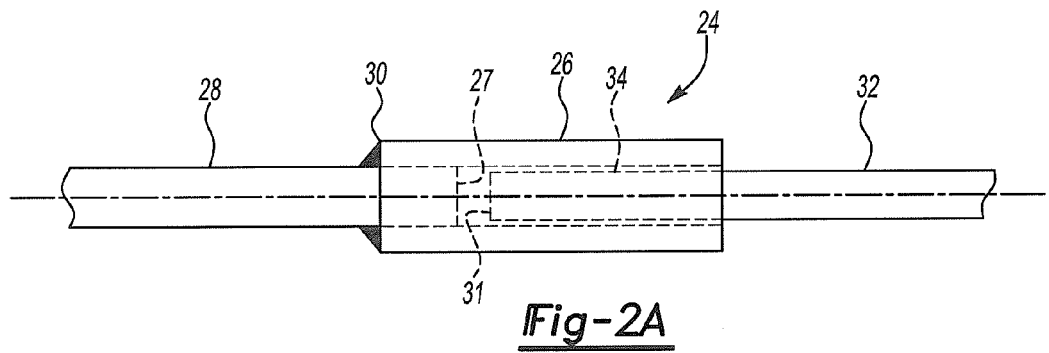
FIG. 2A is a plan view of a portion of the coupler assembly of FIG. 1 taken about line 2A of FIG. 1.

FIG. 2A is a plan view of a portion of cross member assembly 24 taken about line 2A of FIG. 1. Collar 26, e.g., angle iron, 14 mm×14 mm, includes opening 34 to receive end 27 of member 28, e.g., cold formed, high strength 1018 steel, 8 mm×8 mm. Collar 26 is attached with member 28 at weld 30. Opening 34 also receives end 31 of member 32, e.g., cold drawn, high strength 1018 steel, 7.8 mm×7.8 mm.

Figure 2B:
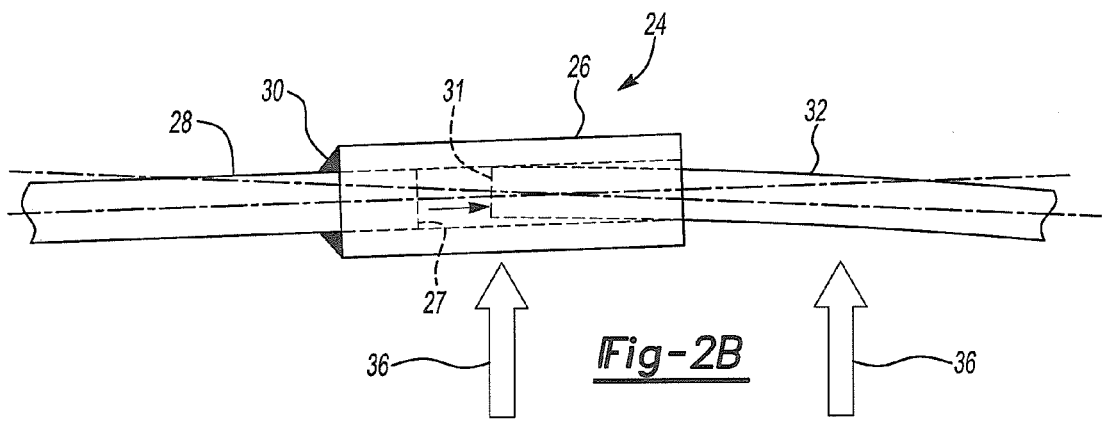
FIG. 2B is another plan view of the portion of the coupler assembly of FIG. 2A.

FIG. 2B is another plan view of the portion of cross member assembly 24 of FIG. 2A. During vehicle impact, an occupant (not shown) may impose displacement force 36 (which may be generally parallel to the road and directed toward the rear of the vehicle) onto cross member assembly 24. As a result, ends 27, 31 of members 28, 32 respectively move away from each other allowing cross member assembly 24 to buckle, or give, in the direction of displacement force 36. In the embodiment of FIG. 2B, member 32 is longer and thinner than member 28. Member 32 thus bends during vehicle impact further allowing cross member assembly 24 to buckle, or give, in the direction of displacement force 36. In some alternative embodiments, member 32 and member 28 may be, for example, the same length and size or member 28 may be longer than member 32, etc. In some alternative embodiments, more than two members may be used.

Figure 3A:
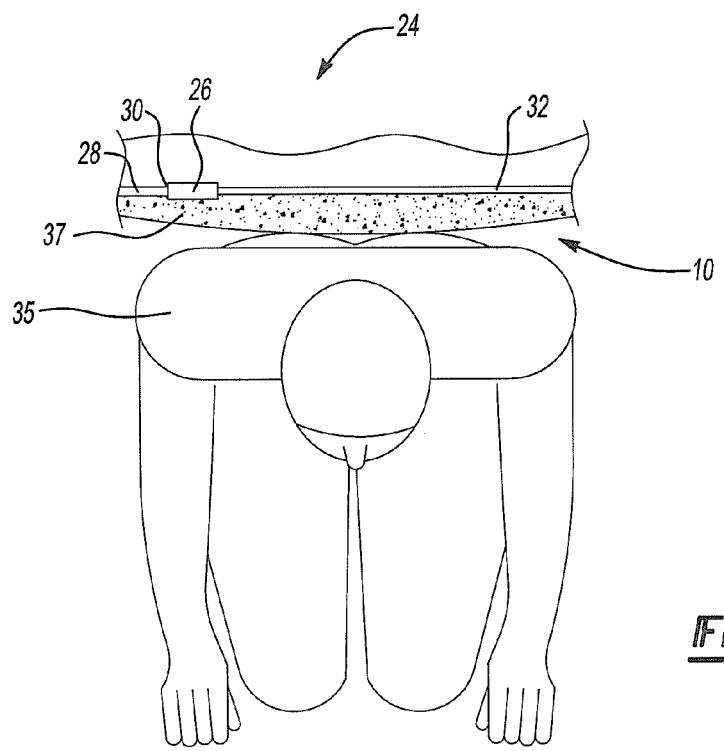
FIG. 3A is a plan view, in cross-section, of a portion of the seat of FIG. 1.

FIG. 3A is a plan view, in cross-section, of a portion of seat 10 prior to vehicle impact. Occupant 35 is seated against seat cushion 37. Members 28, 32 of cross member assembly 24 are aligned, see FIG. 2A.

Figure 3B:
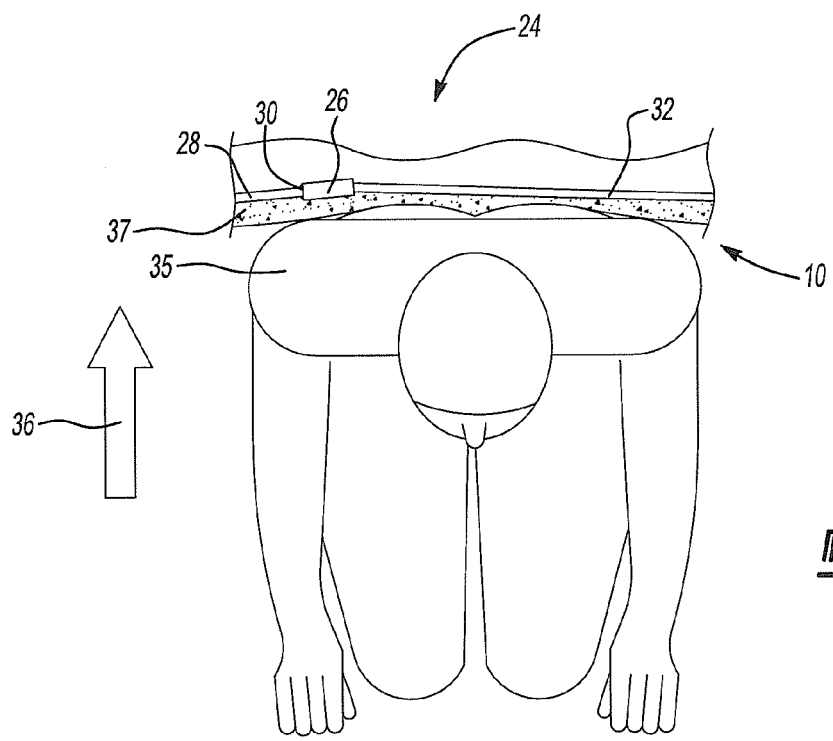
FIG. 3B is another plan view, in cross-section, of the portion of the seat of FIG. 3A.

FIG. 3B is another plan view, in cross-section, of the portion of seat 10 during a rear impact event. The movement of occupant 35 creates displacement force 36 which, as described above, causes cross member assembly 24 to deflect in the direction of displacement force 36, see FIG. 2B. This permits occupant 35, during vehicle impact, to intrude deeper into seat cushion 37 thus allowing them to more quickly come into contact with the seat head restraint (not shown).

Figure 4:
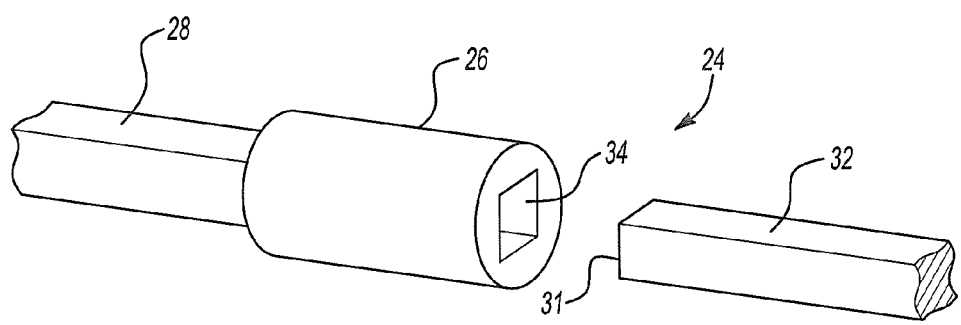
FIG. 4 is an exploded perspective view of the portion of the coupler assembly of FIG. 2A.

FIG. 4 is an exploded perspective view of the portion of cross member assembly 24 of FIG. 2A. Opening 34 has a rectangular profile to mate with the rectangular profile of member 32.

Figure 5:
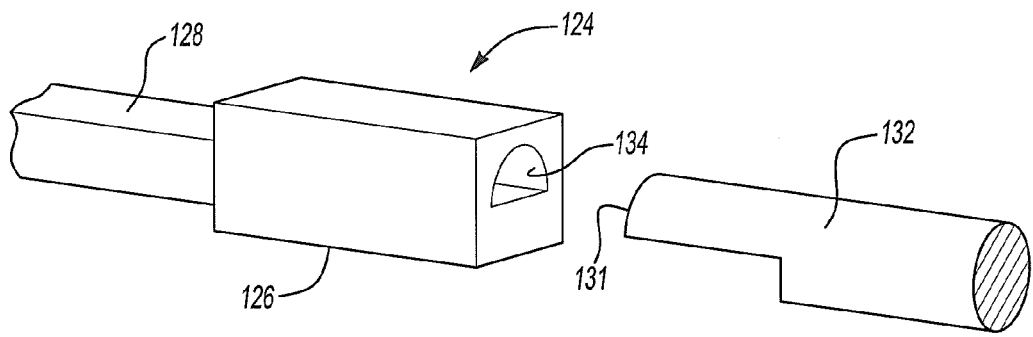
FIG. 5 is an exploded perspective view of a portion of an alternative embodiment of a coupler assembly.

FIG. 5 is an exploded perspective view of a portion of an alternative embodiment of cross member assembly 124. Numbered elements differing by factors of 100 have similar, although not necessarily identical, descriptions. Collar 126 has semi-circular opening 134 for receiving semi-circular end 131 of member 132. In other embodiments, opening 134, collar 126, and members 128, 132 may have any desired profile, e.g., triangular, oval, etc.

Figure 6:
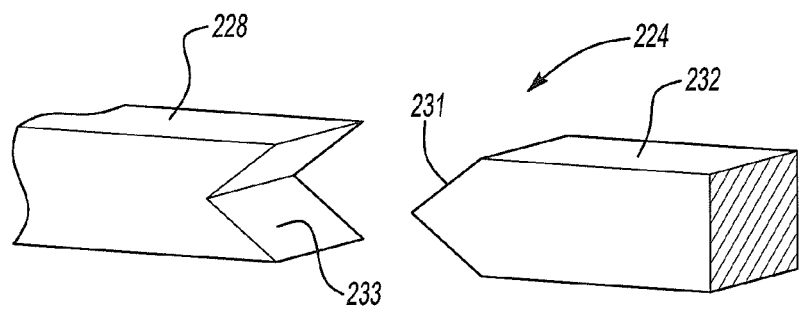
FIG. 6 is an exploded perspective view of a portion of another alternative embodiment of a coupler assembly.

FIG. 6 is an exploded perspective view of a portion of an alternative embodiment of cross member assembly 224. Member 232 includes phillips-style end 231 which mates, when assembled, with complimentary end 233 of member 228.

Figure 7:
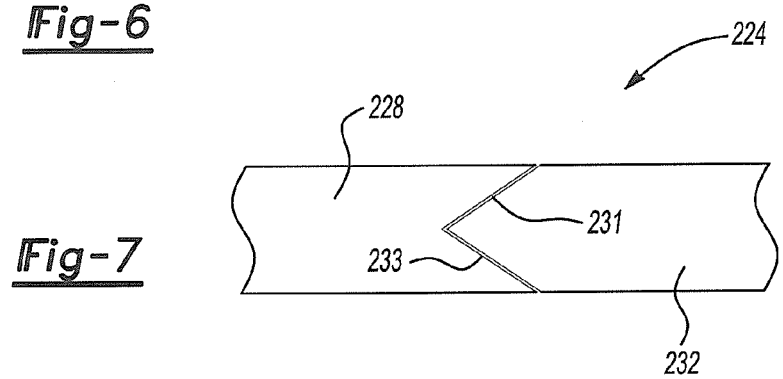
FIG. 7 is a side view of the portion of the coupler assembly of FIG. 6.

FIG. 7 is a side view of the portion of cross member assembly 224. Phillips-style end 231 is seated within complimentary end 233 thus allowing members 228, 232 to rotate under normal operation and to move relative to each other, e.g., separate, during vehicle impact if seat 10 (FIG. 1) is occupied. In this and other similar embodiments, a collar or sleeve is absent.

Figure 8:
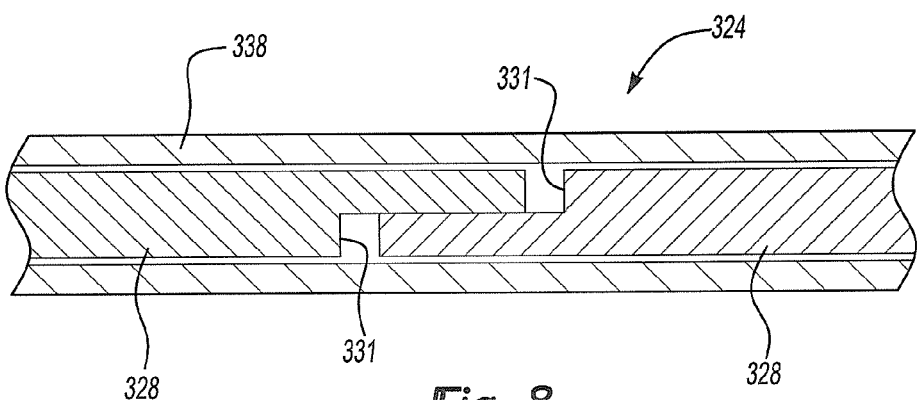
FIG. 8 is a plan view, in cross-section, of another alternative embodiment of a portion of a coupler assembly.

FIG. 8 is a plan view, in cross-section, of a portion of an alternative embodiment of cross member assembly 324. Ends 331 of members 328 mate with each other. This and other similar embodiments reduce the number of different members included in cross member assembly 324. Sleeve 338 covers mating ends 331 such that, as described with reference to FIG. 2B, mating ends 331 move away from each other when subject to a displacement force (not shown) generated by an occupant during vehicle impact.

Figure 9A:
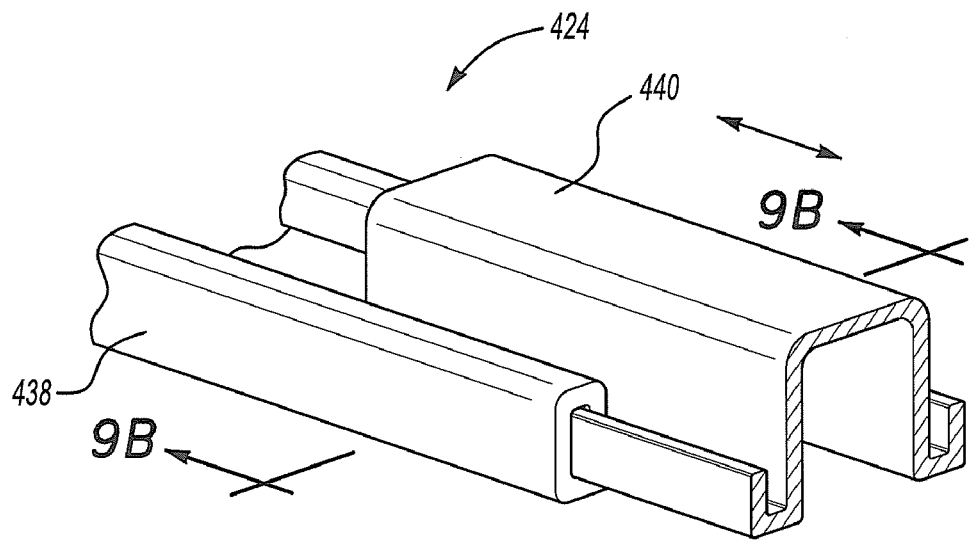
FIG. 9A is a perspective view of a portion of another alternative embodiment of a coupler assembly.

FIG. 9A is a perspective view of a portion of an alternative embodiment of cross member assembly 424. Channel 438 and track 440, as described with reference to FIG. 2B, move relative to one another when subject to a displacement force (not shown) generated by an occupant during vehicle impact.

Figure 9B:
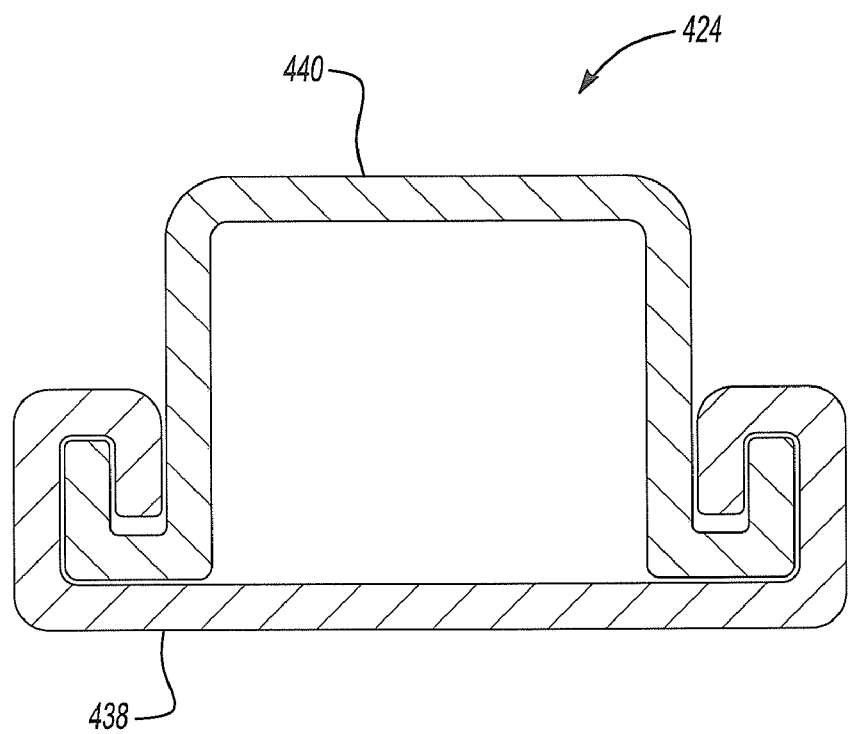
FIG. 9B is a side view, in cross-section, of the coupler assembly of FIG. 9A taken along line 9B-9B of FIG. 9A.

FIG. 9B is a side view, in cross-section, of cross member assembly 424 taken along line 9B-9B of FIG. 9A. Track 440 moves within channel 438.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A reclining seat for a vehicle comprising:
    a bottom frame for supporting a bottom of an occupant;
    a back frame, for supporting a back of the occupant, including first and second sides wherein the back frame is movable relative to the bottom frame; and
    an adjuster system, for moving the back frame relative to the bottom frame, including a torsion bar assembly for transmitting a torque from the first side to the second side to move the back frame relative to the bottom frame wherein the torsion bar assembly includes (i) a first member extending toward the second side and terminating at a first end, (ii) a second member extending toward the first side and terminating at a second end, and (iii) a collar disposed between the first and second sides and configured to receive at least one of the first and second ends and wherein at least one of the first and second ends is configured to slip relative to the collar during vehicle impact if the seat is occupied.

2. The seat of claim 1 wherein at least one of the first and second members is further configured to deform during vehicle impact if the seat is occupied.

3. The seat of claim 1 wherein the collar is fixed with the first member.

4. The seat of claim 3 wherein the collar is welded with the first member.

5. The seat of claim 1 wherein the first member has a first length and the second member has a second length different than the first length.

6. An adjuster assembly for a reclining vehicle seat including a bottom frame for supporting a bottom of an occupant and a back frame including first and second sides for supporting a back of an occupant wherein the back frame is movable relative to the bottom frame via the adjuster assembly, the adjuster assembly comprising:
    a torsion bar assembly for transmitting a torque to move the back frame relative to the bottom frame wherein the torsion bar assembly includes first and second members, wherein the first member extends toward the second member and terminates at a first end, wherein the second member extends toward the first member and terminates at a second end, wherein the first and second ends are adjacent each other and define a coupler section disposed between the first and second sides, and wherein the first and second ends are configured to slip relative to each other at the coupler section during vehicle impact if the seat is occupied.

7. The adjuster assembly of claim 6 wherein at least one of the first and second members is further configured to deform during vehicle impact if the seat is occupied.

8. The adjuster assembly of claim 6 wherein the first member includes a collar configured to receive the second end.

9. The adjuster assembly of claim 8 wherein the first member further includes a shaft and wherein the collar is fixed with the shaft.

10. The adjuster assembly of claim 9 wherein the collar is welded with the shaft.

11. The adjuster assembly of claim 6 wherein the first end comprises a male end and the second end comprises a female end configured to receive the male end.

12. The adjuster assembly of claim 6 wherein the first member comprises a channel and the second member comprises a track configured to move in the channel.

13. The adjuster assembly of claim 6 wherein the first member has a first length and the second member has a second length different than the first length.

14. An adjuster assembly for a reclining vehicle seat including a bottom frame and a back frame movable relative to the bottom frame via the adjuster assembly, wherein the back frame includes first and second sides, the adjuster assembly comprising:
    a torsion member assembly, for transmitting a torque to move the back frame relative to the bottom frame, extending between the first and second sides and including first and second members coupled at an interface section disposed between the first and second sides wherein the first member comprises a channel and the second member comprises a track configured to move in the channel at the interface section during vehicle impact if the seat is occupied.

* * * * *